United States Patent
Fischer et al.

(10) Patent No.: US 6,256,571 B1
(45) Date of Patent: Jul. 3, 2001

(54) METHOD FOR FORMING A DECELERATION SETPOINT ON A MOTOR VEHICLE

(75) Inventors: Joerg Fischer, Esslingen; Michael Reiner, Fellbach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/351,332

(22) Filed: Jul. 12, 1999

(30) Foreign Application Priority Data

Jul. 10, 1998 (DE) .............................. 198 31 070

(51) Int. Cl.$^7$ ...................................... B60T 8/60
(52) U.S. Cl. ................. 701/70; 701/71; 180/179; 303/7; 303/89; 303/191
(58) Field of Search ................ 701/70, 71; 180/179, 180/175; 340/439; 303/155, 15

(56) References Cited

U.S. PATENT DOCUMENTS

| | | | |
|---|---|---|---|
| 4,678,243 | * 7/1987 | Leiber | 303/114 |
| 5,857,754 | * 7/1999 | Fukami et al. | 303/146 |
| 5,924,508 | * 7/1999 | Clauss et al. | 180/179 |
| 5,979,619 | * 11/1999 | Rump | 188/353 |
| 6,053,583 | * 4/2000 | Izumi et al. | 303/150 |
| 6,056,373 | * 5/2000 | Zechmann et al. | 303/191 |
| 6,062,658 | * 5/2000 | Stumpe et al. | 303/155 |

* cited by examiner

Primary Examiner—William A. Cuchlinski, Jr.
Assistant Examiner—Tuan C To
(74) Attorney, Agent, or Firm—Evenson, McKeown, Edwards & Lenahan, P.L.L.C.

(57) ABSTRACT

A method for producing a deceleration setpoint value of a motor vehicle with an electropneumatic brake actuatable by a brake pedal, especially a compressed-air-actuated brake, with a sustained action brake and with at least one device for actuating the brake independently of the driver's desire (external actuation) is characterized by the fact that, with external actuation of the brake and with a simultaneous change in the brake pedal, a resultant deceleration setpoint ($z\_res$) is formed in such fashion that, beginning with the externally set deceleration setpoint ($z\_ext$) with simultaneous actuation of the brake pedal, a curve of the resultant deceleration setpoint ($z\_res$) with the pedal travel is produced which reaches complete deceleration upon full brake pedal travel.

10 Claims, 1 Drawing Sheet

METHOD FOR FORMING A DECELERATION SETPOINT ON A MOTOR VEHICLE

BACKGROUND AND SUMMARY OF THE INVENTION

This application claims the priority of German Application No. 198 31 070.6, filed Jul. 10, 1998, the disclosure of which is expressly incorporated by reference herein.

The invention relates to a method for forming a deceleration setpoint of a motor vehicle, especially a motor vehicle having a compressed-air-actuated electropneumatic brake and at least one device for actuating the brake independently of the driver's manual actuation (external actuation).

An electronically regulated pressure-medium braking device for motor vehicles is found for example, in German Patent documents DE 38 18 617 C2, DE 40 04 502 C2, and DE 38 29 951 A1.

German Patent document DE 40 07 360 C2 teaches a method for brake-pressure distribution to the axles of a motor vehicle with an ABS pressure-medium brake.

In addition, a deceleration control for commercial motor vehicles with electropneumatic brakes is known. In this known device, a deceleration setpoint with a progressive characteristic is associated with a brake pedal travel, as shown schematically in FIG. 2.

A method and a device for controlling the brake system of a vehicle are also known from German Patent document DE 195 26 659 A1. Hence, a set deceleration is specified at least during panic braking dependent on the actuating signal of the brake pedal and its gradient. The deceleration is maintained by a regulator by influencing the wheel brakes, possibly individually for each wheel. In this situation, the driver influences the vehicle deceleration in every operating situation, including operating situations with automatic braking triggered by the driver.

An actuating unit for an electronically controlled vehicle braking system is found in German Patent document DE 196 38 102 C1. This system has a braking force amplifier that can be actuated by a brake pedal. The amplifier has a main brake cylinder and a reservoir for hydraulic fluid. A first braking device is coupled with at least one first vehicle wheel. The device is connectable by an electronically controlled first valve arrangement in a basic position with the main brake cylinder or separable therefrom in an actuating position. Another device can be connected with the main brake cylinder for simulating brake pedal behavior. This device has a spring arrangement set up to work against the hydraulic pressure from the main brake cylinder. The system also has one characteristic modulating device. In this manner, the brake pedal feel offered to the driver is modeled on conventional vehicle brake systems in a known fashion.

A vehicle brake system with a recovery brake is known from German Patent document DE 195 24 228 A1. Here, the recovery brake is designed so that firstly there is always a permanent relationship between the brake pedal travel and the braking effect and secondly the development of an error in the recovery brake can be compensated. This is achieved by there being a continuous mechanical-hydraulic connection between a brake pedal and the wheel brake cylinders.

A hydraulic vehicle braking system whose normal service brake operation can be performed using hydraulic outside energy follows from German Patent document DE 196 53 308 A1.

A hydraulic auxiliary force or outside force braking system for motor vehicles is also known from German Patent document DE 196 18 489 A1.

It is known from automobiles with hydraulic auxiliary force braking systems to use spacing regulating systems in which the distance from a leading vehicle is detected by sensors and, when this spacing drops below a minimum value, the service brake system of the automobile is externally actuated. As a result of the external actuation by the vacuum amplifier, the brake pedal is also moved. In this way, it is possible for the driver of the automobile to step on it with the pedal feel with which he is familiar.

It is now intended in the future, in commercial vehicles as well, to permit intervention in the braking system of the vehicle independently of actuation of the brake pedal in order, for example, to perform automatic spacing regulation for example in the form of a speed regulating device coupled with distance regulation (proximity controlled cruise control). However, in the outside force compressed air brake systems used in commercial vehicles, it is not readily possible to provide the driver with feedback in the event of external actuation of the brake so that the position of the brake pedal remains unchanged.

The goal of the invention is therefore to improve on the method for forming a deceleration setpoint such that, even with external actuation of the brake, a pedal characteristic that is normal for the driver can be achieved so that, in particular, it is possible for the driver to deliberately step on the brake pedal with the pedal feel with which he is familiar. The method is intended to be used especially in a compressed-air-actuated electropneumatic brake used in commercial vehicles.

This goal is achieved according to the present invention in a method for forming a deceleration setpoint of the type described at the outset in such fashion that, upon external actuation of the brake and with simultaneous change of position of the brake pedal, a resultant deceleration setpoint is formed. This is done so that, beginning with the externally set deceleration setpoint, with simultaneous actuation of the brake pedal, a curve of the resultant deceleration setpoint with pedal travel is formed which reaches complete deceleration upon full brake pedal travel.

As a result, even with external actuation of the brake and with simultaneous actuation of the brake pedal by the driver, an increase in deceleration of actuation of the brake pedal by the driver is also made possible. Thus, with external actuation of the brake, a realistic pedal feel is made possible when stepping on the brake pedal.

Advantageously, the resultant deceleration setpoint is determined as a function of a deceleration setpoint derived from the pedal position and from a deceleration setpoint demanded by the at least one device for external actuation according to the following functional relationship:

A. when the deceleration setpoint derived from the pedal position is equal to zero and the deceleration setpoint demanded by the device for external actuation is not equal to zero, then the resultant deceleration setpoint corresponds to the deceleration setpoint demanded by the device for external actuation;

B. when the deceleration setpoint derived from the pedal position is greater than zero and the deceleration setpoint demanded by the device for external actuation is not equal to zero, then the following is valid:

B1. When the deceleration setpoint derived from the pedal position appears up to a time threshold that can be preset, before or approximately simultaneously with the deceleration setpoint demanded by the device for external actuation (z_extern), the following functional relationship exists between the resultant deceleration setpoint (z_res), the deceleration setpoint (z_pedal) derived from the pedal position, and the deceleration setpoint (z_extern) demanded by the device for external actuation:

$$z\_res[\%]=max(z\_pedal[\%]min(z\_extern[\%]; a \cdot z\_pedal[\%]+b))$$

where a and b are weighting factors that indicate a priority between the driver's desired actuation and the external system; and B2. for the resultant deceleration setpoint z_res of the functional relationship $$z\_res[\%]=z\_pedal[\%]+z\_extern[\%](1-z\_pedal[\%]/100)$$

when the deceleration setpoint z_extern demanded by the device for external actuation is longer than a specified time threshold before the deceleration setpoint z_pedal derived from the pedal position.

The time threshold is advantageously 500 milliseconds.

Of course, the above mathematical function represents only one embodiment. The dependence of the resultant deceleration setpoint on the deceleration setpoint derived from the pedal position and the deceleration setpoint demanded by the device for external actuation can also be defined in a different way.

As a result of this function, there is a family of curves that permits a shift of the resultant deceleration setpoint over a characteristic that is displaced by the deceleration setpoint demanded by at least one external system (desired braking). Advantageously, to produce the deceleration setpoint in a commercial vehicle, in addition to the compressed-air-actuated electropneumatic brake, depending on the driving and loading state of the vehicle, the sustained action brake is also actuated.

When towing, to produce the deceleration setpoint, the brake of a trailer or semitrailer is also actuated.

In addition, it is advantageously provided that, in the event of problems and/or at least partial failure of the compressed-air-actuated electropneumatic brake and/or of a sustained action brake, the deceleration setpoint demanded by the at least one device for external actuation is set to zero.

Other objects, advantages and novel features of the present invention will become apparent from the following detailed description of the invention when considered in conjunction with the accompanying drawings.

DETAILED DESCRIPTION OF THE DRAWINGS

One embodiment of the method is described for example with reference to a compressed-air-actuated electropneumatic brake like that used in commercial vehicles. Of course, however, the method is not limited to compressed-air-actuated electropneumatic brakes but theoretically can be used in all brakes, especially also in hydraulic brake systems like those used in automobiles.

Figure 2:
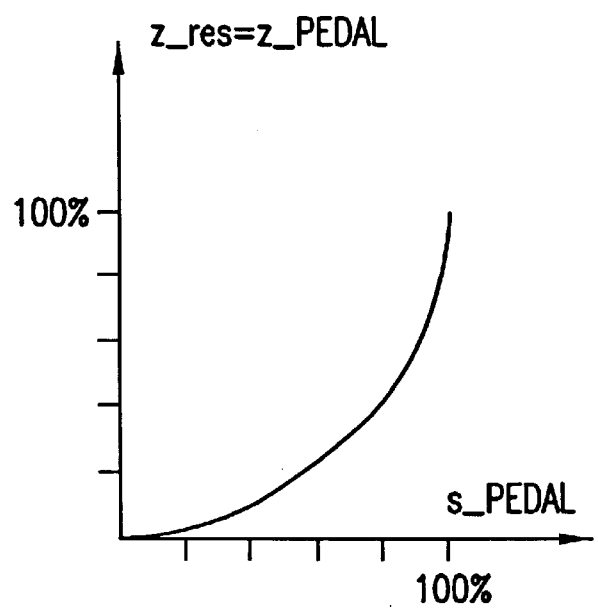
FIG. 2 represents the deceleration setpoint versus the change in pedal position in a method known from the prior art.

As can be seen from FIG. 2, in a method for forming the deceleration setpoint of a motor vehicle with a compressed-air-actuated electropneumatic brake and a sustained action brake with an increasing s_pedal position change, a resultant deceleration setpoint z_res is produced that describes a parabola similar to a progressive curve.

If the vehicle has a device for external actuation, in other words a device for actuating the compressed-air-actuated electropneumatic brake and/or the sustained action brake independently of the driver's actuation, for example in order to produce proximity controlled cruise control or the like, the resultant deceleration setpoint z_res depends not only on the change in pedal position z_pedal but also on the setpoint z_extern demanded by the at least one device for external actuation. Both deceleration setpoints z_pedal and z_extern become the resultant deceleration setpoints z_res according to the following functional relationship:

A. when z_pedal=0 and z_extern≠0, then z_res=z_extern, and

B. when z_pedal>0 and z_extern≠0, then:

B1. when z_pedal appears up to a presettable time threshold before or approximately simultaneously with z_extern:

$$z\_res=max(z\_pedal; min(z\_extern; a \cdot z\_pedal+b),$$

where a and b are weighting factors that express a priority between the drivers wish and external system, and B2. when z_extern appears longer than the specified time threshold before z_pedal, then:

$$z\_res[\%]=z\_pedal[\%]+z\_extern[\%](1-z\_pedal[\%]/100)$$

Figure 1:
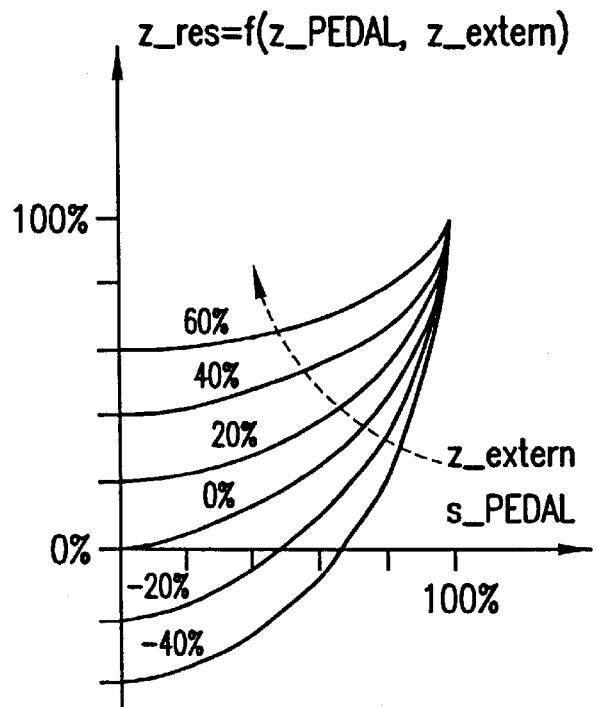
FIG. 1 is a schematic diagram of the resultant deceleration setpoint versus the change in pedal position in a method according to the present invention.

The functional relationship between z_res and z_pedal is shown schematically in FIG. 1. In contrast to the relationship shown in FIG. 1 between z_res and z_pedal, the resultant deceleration setpoint z_res shown in FIG. 1, which depends both on z_pedal and on z_extern, at each deceleration setpoint z_extern demanded by the additional device for external actuation, permits a change in the resultant deceleration setpoint z_res as a function of pedal position s_pedal and thus of deceleration setpoint z_pedal derived from the pedal position. In this manner, for example, when the driver steps on the pedal, an increase in resultant deceleration setpoint z_res occurs.

As also shown in FIG. 1, when driving on an incline it is also possible that the deceleration setpoint z_extern demanded by the additional device for external actuation is also less than zero; hence a resultant deceleration setpoint z_res results that is likewise less than zero. In this case, the vehicle is accelerated under control.

In addition to the actuation of the compressed-air-actuated electropneumatic brake, in actuation of the sustained action brake of the vehicle as well as during operation of the vehicle as a towing vehicle, the brake of the trailer or semitrailer is actuated.

If the service or sustained action brake should fail, z_extern is set to zero.

The above described method for producing the deceleration set point of the motor vehicle can be carried out in accordance with a control unit of the vehicle. The use of such microprocessor based control units are well known in motor vehicles. The control unit can be operated under the software control in order to perform the above-described method. Of course, the control unit could be hardware implemented, or implemented in some combination of hardware and software.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method of forming a deceleration setpoint of a motor vehicle having an electropneumatic brake actuatable by a brake pedal upon a driver's manual actuation and at least one device for actuating the brake independently of the driver's manual actuation, the method comprising the acts of:

obtaining an externally set deceleration setpoint (z_ext) with simultaneous actuation of the brake pedal;

forming a resultant deceleration setpoint (z_res) upon the manual actuation of the brake and the simultaneous change in the brake pedal position such that a curve of the resultant deceleration setpoint (z_res) is achieved with a travel of the brake pedal which, during complete brake pedal travel reaches complete deceleration of the vehicle.

2. The method according to claim 1, wherein the act of forming the resultant deceleration setpoint further comprises the acts of:

determining the resultant deceleration setpoint as a function of a deceleration setpoint (z_pedal) derived from the pedal position and a deceleration setpoint (z_extern) demanded by said at least one device for independent actuation according to the following functional relationship:

When z_pedal=0 and z_extern≠0, (1)

then:
z_res=z_extern, and when z_pedal>0 and z_extern≠0, (2)

then
(a) when z_pedal appears up to a presettable time threshold, before or approximately simultaneously with z_extern z_res=max(z_pedal; min(z_extern; a−z_pedal+b))

where a, b are weighting factors that express a priority between the driver's wish and the external system, and
(b) when z_extern appears longer than the specified time threshold before z_pedal z_res[%]=z_pedal[%]+z_extern[%](1−z_pedal[%]/100).

3. The method according to claim 2, wherein the specified time threshold is 500 milliseconds.

4. The method according to claim 1, wherein in addition to the electropneumatic brake, in order to produce the resultant deceleration setpoint, a sustained action brake of the vehicle is actuated depending upon a driving and loading state of the vehicle.

5. The method according to claim 4, wherein in order to produce the resultant deceleration setpoint, an additional brake of a trailer or semitrailer is actuated.

6. The method according to claim 5, wherein, upon at least partial failure of the electropneumatic brake and/or the sustained action brake, the deceleration setpoint (z_extern) demanded by the at least one external device is set to zero.

7. The method according to claim 1, wherein the electropneumatic brake is operated by compressed air.

8. A computer product for use in a motor vehicle having an electropneumatic brake actuatable by a brake pedal and at least one device for actuating the brake independently of a driver's actuation, the computer product comprising:

a computer readable medium having stored thereon program code segments that
form a resultant deceleration setpoint (z_res) with an external actuation of the brake and with a simultaneous change in the brake pedal such that, beginning with an externally set deceleration setpoint (z_ext) with simultaneous actuation of the brake pedal, a curve of the resultant deceleration set point (z_res) is achieved with the pedal travel which during complete brake pedal travel reaches complete deceleration.

9. The computer product according to claim 8, wherein the computer readable medium further includes program segments stored thereon that:

determine the resultant deceleration setpoint as a function of a deceleration setpoint derived from the pedal position and form a deceleration setpoint demanded by the at least one device for external actuation in accordance with the following relationship:

When z_pedal=0 and z_extern≠0, (1)

then:
z_res=z_extern, and when z_pedal>0 and z_extern≠0, (2)

then
(a) when z_pedal appears up to a presettable time threshold, before or approximately simultaneously with z_extern z_res=max(z_pedal; min(z_extern; a−z_pedal+b))

where a, b are weighting factors that express a priority between the driver's wish and the external system, and
(b) when z_extern appears longer than the specified time threshold before z_pedal z_res[%]=z_pedal[%]+z_extern[%](1−z_pedal[%]/100).

10. A method for producing a deceleration set point value of a motor vehicle having an electropneumatic brake actuatable by a brake pedal and at least one device for actuating the brake independently of a driver, the method comprising the acts of:

determining a beginning externally set deceleration setpoint (z_ext) with a simultaneous actuation of the brake pedal and external actuation of the brake; and producing a curve of the resultant deceleration setpoint (z_res), beginning with the externally set deceleration setpoint, with the pedal travel which reaches complete deceleration upon full brake pedal travel.

* * * * *